US012756142B2

(12) United States Patent
Sakai

(10) Patent No.: US 12,756,142 B2
(45) Date of Patent: Oct. 6, 2026

(54) SHIELDED CABLE CONNECTOR WITH PROTRUSION-EQUIPPED SHIELD BRACKET AND WIRING HARNESS

(71) Applicant: SUMITOMO WIRING SYSTEMS, LTD., Mie (JP)

(72) Inventor: Hiroki Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 359 days.

(21) Appl. No.: 18/405,126

(22) Filed: Jan. 5, 2024

(65) Prior Publication Data

US 2024/0243525 A1 Jul. 18, 2024

(30) Foreign Application Priority Data

Jan. 13, 2023 (JP) ................................ 2023-003904

(51) Int. Cl.
*H01R 13/6581* (2011.01)
*H01B 7/00* (2006.01)
*H01R 13/512* (2006.01)

(52) U.S. Cl.
CPC ....... *H01R 13/6581* (2013.01); *H01B 7/0045* (2013.01); *H01R 13/512* (2013.01)

(58) Field of Classification Search
None
See application file for complete search history.

(56) References Cited

U.S. PATENT DOCUMENTS 5,059,140 A * 10/1991 Philippson ......... H01R 13/6593 439/607.02
5,848,914 A * 12/1998 Lang .................. H01R 13/6592 439/607.47
6,162,086 A * 12/2000 Kuo ................... H01R 13/6582 439/497
2020/0366017 A1* 11/2020 Blackburn ............. H01R 12/79
2022/0140539 A1* 5/2022 Wang ................... H01R 13/506 439/607.56

FOREIGN PATENT DOCUMENTS

JP H05-053162 U 7/1993
JP H07-011782 U 2/1995
JP 2017-069159 A 4/2017

* cited by examiner

*Primary Examiner* — Oscar C Jimenez
(74) *Attorney, Agent, or Firm* — Venjuris, P.C.

(57) ABSTRACT

A connector 30 is provided with a metal-made terminal to be connected to an end part of a core wire 21 and an electrically conductive shield shell 50 for covering the terminal. The connector 30 is provided with a shield bracket 80 for pressing and fixing a shielded cable 20 to a shield shell 50 with an electromagnetic shield member 23 electrically connected to the shield shell 50. The shield shell 50 has a first facing surface 62 facing the electromagnetic shield member 23. The shield bracket 80 has a second facing surface 82 facing the electromagnetic shield member 23. At least one of the first and second facing surfaces 62, 82 is provided with a protrusion projecting toward the electromagnetic shield member 23 and to be brought into contact with the shielded cable 20.

9 Claims, 9 Drawing Sheets

SHIELDED CABLE CONNECTOR WITH PROTRUSION-EQUIPPED SHIELD BRACKET AND WIRING HARNESS

CROSS-REFERENCE TO RELATED APPLICATIONS

This application is based on and claims priority from Japanese Patent Application No. 2023-003904, filed on Jan. 13, 2023, with the Japan Patent Office, the disclosure of which is incorporated herein in its entirety by reference.

TECHNICAL FIELD

The present disclosure relates to a connector and a wiring harness.

BACKGROUND

Conventionally, a wiring harness to be routed inside a vehicle such as a hybrid or electric vehicle is known to include a shielded cable and a connector mounted on an end part of the shielded cable (see, for example, Japanese Patent Laid-open Publication No. 2017-069159, and Japanese Utility Model Laid-open Publication Nos. H05-053162 and H07-011782). The shielded cable includes an electrically conductive core wire, an insulation coating surrounding the outer periphery of the core wire, an electromagnetic shield member surrounding the outer periphery of the insulation coating and a sheath surrounding the outer periphery of the electromagnetic shield member. In the shielded cable of this type, an end part in an axial direction of the electromagnetic shield member is folded to cover the outer peripheral surface of the sheath. An annular crimp ring is mounted on the outer periphery of the folded part of the electromagnetic shield member. The electromagnetic shield member and the crimp ring are electrically connected by contacting each other. The crimp ring is in contact with the inner peripheral surface of a metal-made shield shell of the connector. The crimp ring and the shield shell are electrically connected by contacting each other.

SUMMARY

In the wiring harness as described above, it is desired to ensure stable electromagnetic shielding performance.

The present disclosure aims to provide a connector and a wiring harness capable of ensuring stable electromagnetic shielding performance.

The present disclosure is directed to a connector to be connected to an end part of a shielded cable including an electrically conductive core wire, an insulation coating surrounding an outer periphery of the core wire and an electrically conductive electromagnetic shield member surrounding an outer periphery of the insulation coating, the connector being provided with an electrically conductive terminal to be connected to an end part of the core wire, an electrically conductive shield shell for covering the terminal, and a shield bracket for pressing and fixing the shielded cable to the shield shell with the electromagnetic shield member electrically connected to the shield shell, the shield shell having a first facing surface facing the electromagnetic shield member, the shield bracket having a second facing surface facing the electromagnetic shield member, and at least one of the first and second facing surfaces being provided with a protrusion projecting toward the electromagnetic shield member and to be brought into contact with the shielded cable.

According to the connector and wiring harness of the present disclosure, an effect of ensuring stable electromagnetic shielding performance is achieved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
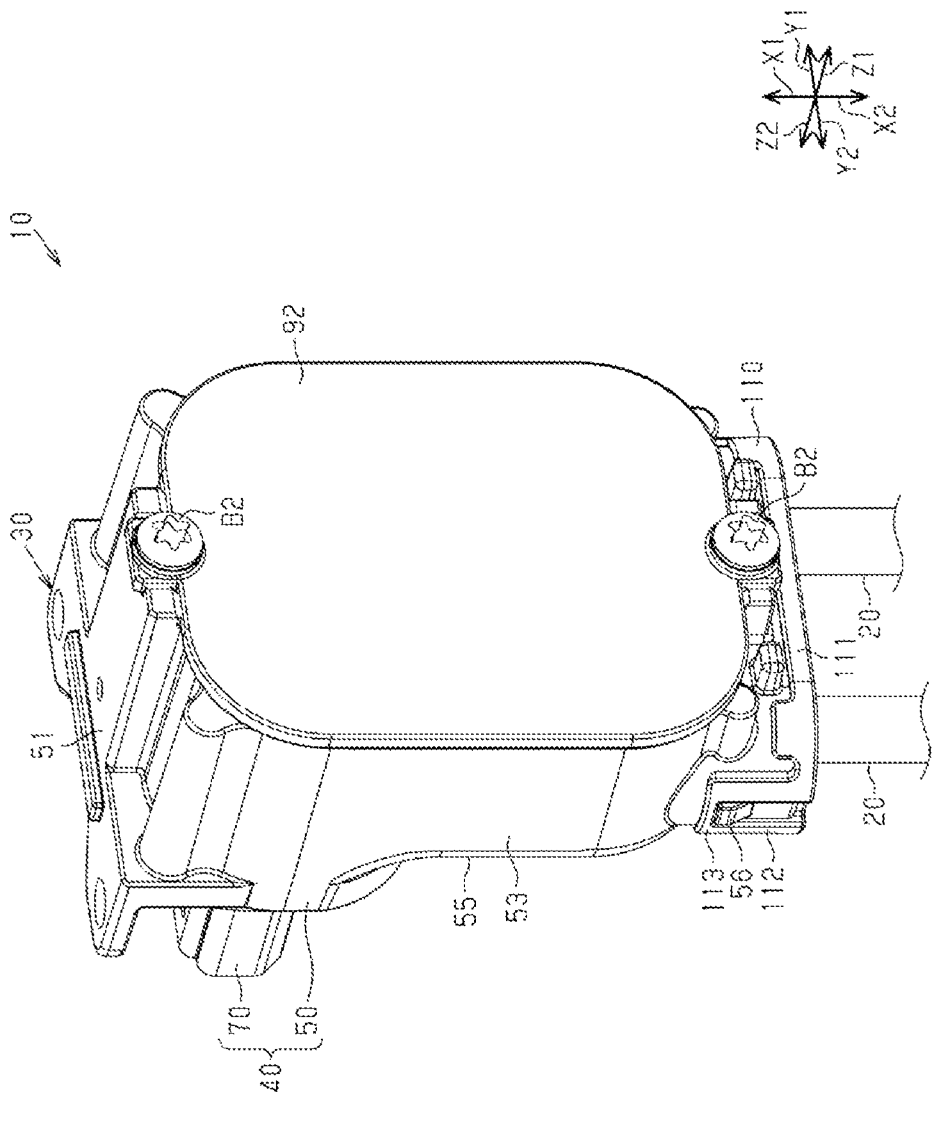
FIG. 1 is a schematic perspective view showing a wiring harness of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

[1] The connector of the present disclosure is to be connected to an end part of a shielded cable including an electrically conductive core wire, an insulation coating surrounding an outer periphery of the core wire and an electrically conductive electromagnetic shield member surrounding an outer periphery of the insulation coating, and provided with an electrically conductive terminal to be connected to an end part of the core wire, an electrically conductive shield shell for covering the terminal, and a shield bracket for pressing and fixing the shielded cable to the shield shell with the electromagnetic shield member electrically connected to the shield shell, the shield shell having a first facing surface facing the electromagnetic shield member, the shield bracket having a second facing surface facing the electromagnetic shield member, and at least one of the first and second facing surfaces being provided with a protrusion projecting toward the electromagnetic shield member and to be brought into contact with the shielded cable.

According to this configuration, at least one of the first facing surface of the shield shell and the second facing surface of the shield bracket is provided with the protrusion projecting toward the electromagnetic shield member and to be brought into contact with the shielded cable. Thus, if the shielded cable is pressed against the shield shell by the shield bracket, the protrusion can be suitably brought into contact with the shielded cable.

If the first and second facing surfaces are smooth curved surfaces or flat surfaces having no protrusions, it is difficult to set contact positions of the first and second facing surfaces with the shielded cable. Thus, it is difficult to set a shield connection position of the shield shell and the electromagnetic shield member of the shielded cable and a shield connection state of the shield shell and the electromagnetic shield member of the shielded cable tends to be unstable. For example, if the first and second facing surfaces are smooth surfaces having no protrusions, contact areas of the first and second facing surfaces with the shielded cable easily vary. Thus, the shield connection state of the shield shell and the electromagnetic shield member is not stabilized and electromagnetic shielding performance by the shield shell and the electromagnetic shield member varies.

In contrast, in the above configuration, the contact position of the shield shell and the shield bracket with the shielded cable can be forcibly set at the position of the protrusion by providing the protrusion on at least one of the first and second facing surfaces. Thus, the shield connection position of the shield shell and the shield bracket with the electromagnetic shield member of the shielded cable is easily set, and the shield connection state of the shield shell and the electromagnetic shield member can be stabilized. In this way, stable electromagnetic shielding performance can be ensured.

[2] In [1] described above, the protrusions may include one or more first protrusions projecting from the first facing surface toward the electromagnetic shield member and to be brought into contact with the shielded cable, and one or more second protrusions projecting from the second facing surface toward the electromagnetic shield member and to be brought into contact with the shielded cable.

According to this configuration, the contact position of the shield shell and the shielded cable is forcibly set as the position of the first protrusion by providing the first protrusion on the first facing surface. Further, the contact position of the shield bracket and the shielded cable is forcibly set as the position of the second protrusion by providing the second protrusion on the second facing surface. Thus, the shield connection positions of the shield shell and the shield bracket with the electromagnetic shield member of the shielded cable are easily set, and the shield connection state of the shield shell and the electromagnetic shield member can be easily stabilized. In this way, stable electromagnetic shielding performance can be ensured.

[3] In [2] described above, the second protrusion may have an embossed shape.

According to this configuration, the second protrusion can be easily formed on the second facing surface of the shield bracket.

[4] In any one of [1] to [3] described above, the shield bracket may press and fix the shielded cable to the shield shell in a direction intersecting an axial direction of the shielded cable, and the protrusion may extend along the axial direction of the shielded cable.

According to this configuration, since the protrusion extending along the axial direction of the shielded cable can be brought into contact with the shielded cable, a wide contact area of the protrusion and the shielded cable can be ensured.

[5] In any one of [1] to [4] described above, the shield bracket may be bolted to the shield shell with the shielded cable pressed against the shield shell.

According to this configuration, the shield bracket is bolted to the shield shell. The shielded cable can be pressed toward the first facing surface of the shield shell via the shield bracket by an axial force of a bolt generated at the time of bolting. In this way, the protrusion and the shielded cable can be suitably brought into contact.

[6] In any one of [1] to [5] described above, the shield bracket may include a plurality of fixing portions having the second facing surfaces and a coupling portion coupling the plurality of fixing portions, and the coupling portion of the shield bracket may be bolted to the shield shell with a plurality of the shielded cables pressed against the shield shell by the plurality of fixing portions.

According to this configuration, the plurality of shielded cables can be pressed and fixed to the shield shell by the single shield bracket. In this way, the number of components can be reduced as compared to the case where the shield bracket is provided individually for each of the plurality of shielded cables.

[7] In any one of [1] to [6] described above, a connector housing may be provided which includes the shield shell, the connector housing may include a positioning projection projecting toward the shield bracket, and the shield bracket may include a positioning hole to be fit to the positioning projection and engaged with the positioning projection in an axial direction of the shielded cable.

According to this configuration, the shield bracket can be easily positioned with respect to the connector housing in the axial direction of the shielded cable by fitting the positioning hole of the shield bracket to the positioning projection of the connector housing. In this way, workability in fixing the shield bracket to the connector housing can be improved.

[8] In any one of [1] to [7] described above, the shield shell may be made of aluminum die casting.

According to this configuration, the electrically conductive shield shell can be easily manufactured.

[9] A wiring harness of the present disclosure is provided with the connector of any one of [1] to [8] described above and the shielded cable to be connected to the terminal.

According to this configuration, effects similar to those of the connector of [1] described above can be achieved.

[10] In [9] described above, the shielded cable may include an electrically conductive shell ring to be mounted on an outer periphery of the electromagnetic shield member while being held in contact with an outer peripheral surface of the electromagnetic shield member, and the protrusion may be in contact with an outer peripheral surface of the shell ring.

According to this configuration, a contact position of the shield shell and the shield bracket with the shell ring can be forcibly set as the position of the protrusion. Thus, a shield connection position of the shield shell and the shell ring is easily set, and a shield connection state of the shield shell and the shell ring can be stabilized. Consequently, a shield connection state of the electromagnetic shield member electrically connected to the shell ring and the shield shell can be stabilized. In this way, stable electromagnetic shielding performance can be ensured.

DETAILS OF EMBODIMENT OF PRESENT DISCLOSURE

Specific examples of a connector and a wiring harness of the present disclosure are described below with reference to the drawings. For the convenience of description, some components may be shown in an exaggerated or simplified manner in each drawing. Further, a dimension ratio of each part may be different in each figure. "Parallel", "orthogonal" and "horizontal" in this specification mean not only strictly parallel, orthogonal and horizontal, but also substantially parallel, orthogonal and horizontal within a range in which functions and effects in this embodiment are achieved. Further, a term "annular" used in the description of this specification may indicate an arbitrary structure forming a loop or a structure having an endless continuous shape or a loop shape as a whole such as a C shape having a gap. Note that "annular" shapes include circular shapes, elliptical shapes and polygonal shapes having pointed or round corners, but there is no limitation to these. In this specification, "semicircles" include not only semicircles obtained by bisecting true circles, but also similar shapes having a longer or shorter arc than semicircles obtained by bisecting true circles. "Facing each other" in this specification indicates that surfaces or members are at positions in front of each other, and means not only a case where the surfaces or members are at positions perfectly in front of each other, but also a case where the surfaces or members are partially in front of each other. Further, "facing each other" in this specification means both a case where another member different from two parts is interposed between the two parts and a case where nothing is interposed between the two parts. Further, terms such as "first", "second" and "third" are merely used to distinguish objects and do not rank the objects. Further, an expression "at least one" used in this specification means "one or more" desired options. As one example, the expression "at least one" used in this specification means "only one option" or "both of two options" if there are two options. As another example, the expression "at least one" used in this specification means "only one option" or "a combination of two or more arbitrary options" if there are three options. Note that the present invention is not limited to these illustrations, but is represented by claims and intended to include all changes in the scope of claims and in the meaning and scope of equivalents.

(Overall Configuration of Wiring Harness 11)

Figure 2:
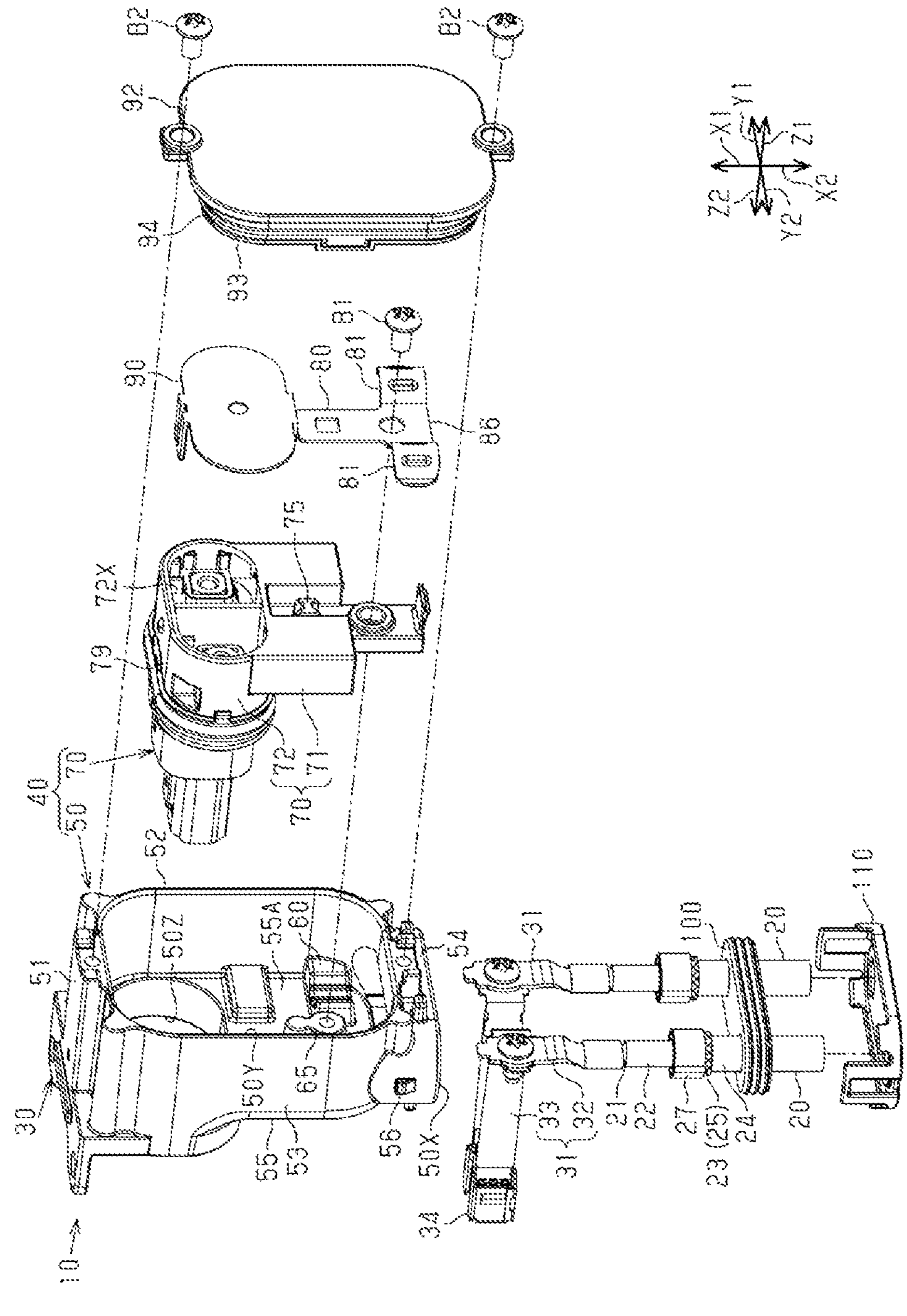
FIG. 2 is a schematic exploded perspective view showing the wiring harness of the embodiment.

As shown in FIGS. 1 and 2, a wiring harness 10 includes one or more (two in this embodiment) shielded cables 20 and a connector 30 mounted on end parts of the shielded cables 20. The wiring harness 10 is, for example, provided in a vehicle such as a hybrid or electric vehicle. The wiring harness 10 is for electrically connecting electrical devices for vehicle such as a high-voltage battery, an inverter and a vehicle wheel drive motor. The connector 30 is, for example, connected to one electrical device. The connector 30 is, for example, a waterproof connector. Note that a vertical direction and a lateral direction in each figure are not necessarily used to express the postures of the connector 30 and the wiring harness 10 during use.

(Overall Configuration of Connector 30)

Figure 3:
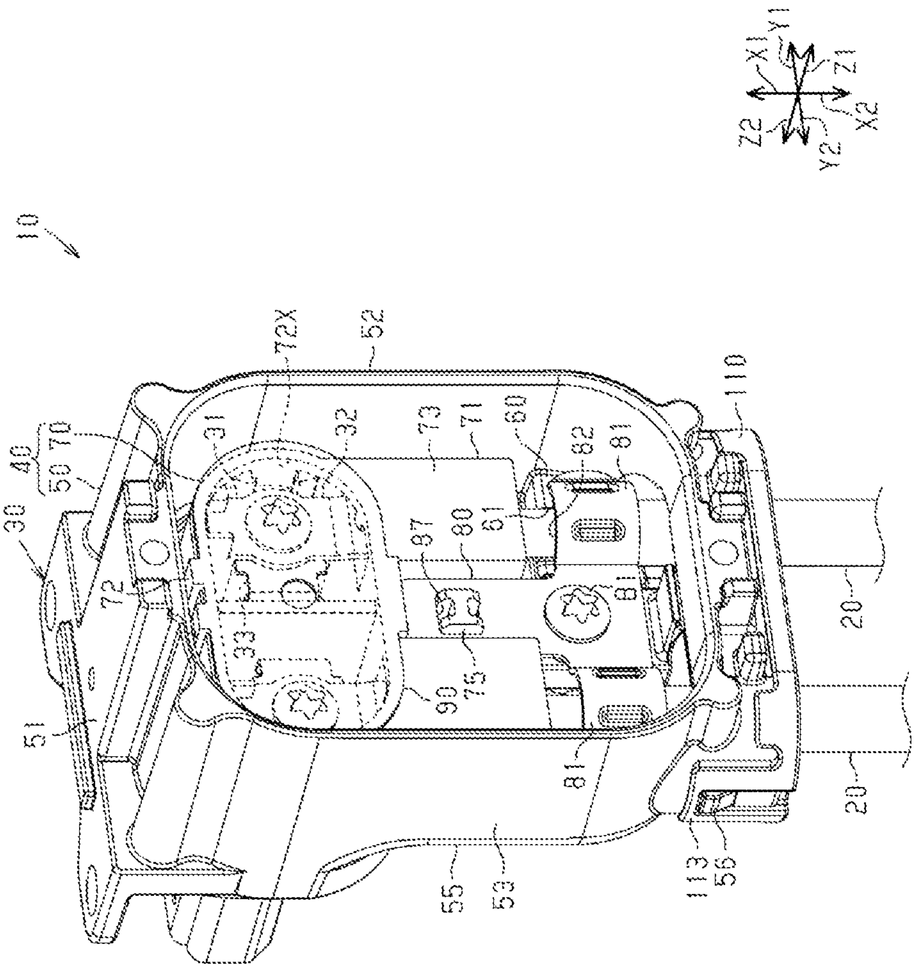
FIG. 3 is a schematic perspective view showing a part of the wiring harness of the embodiment.
Figure 4:
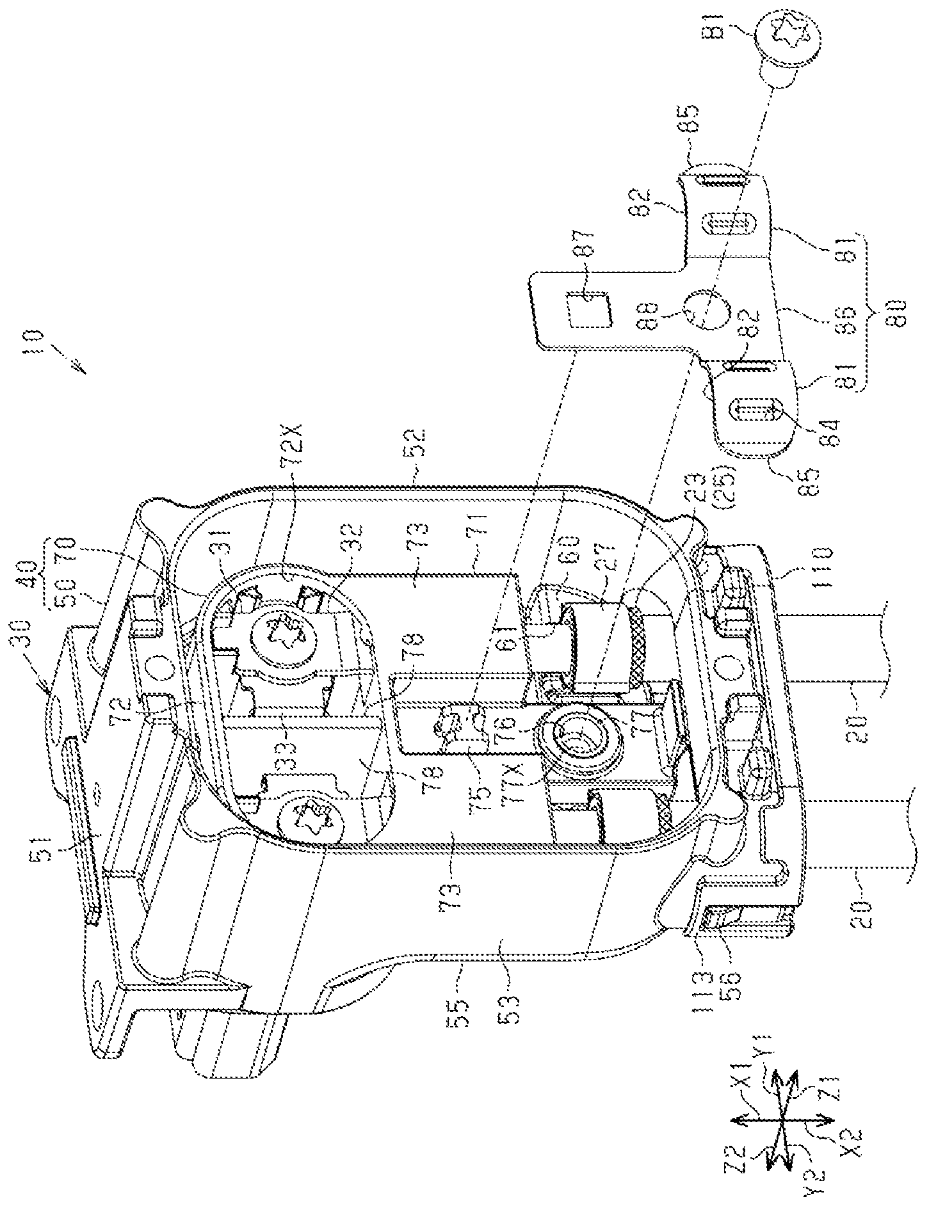
FIG. 4 is a schematic exploded perspective view showing a part of the wiring harness of the embodiment.

As shown in FIGS. 2 to 4, the connector 30 includes a plurality of terminals 31 respectively connected to end parts of the plurality of shielded cables 20 and an annular connector housing 40 for accommodating the plurality of terminals 31. The connector housing 40 includes an electrically conductive shield shell 50 for covering the plurality of terminals 31 and an inner housing 70 to be accommodated inside the shield shell 50. The connector 30 includes a shield bracket 80 to be fixed to the connector housing 40 and a bolt B1 for fixing the shield bracket 80 to the connector housing 40. As shown in FIG. 2, the connector 30 includes, for example, a cover 90 for closing an opening 72X of the inner housing 70, a lid member 92 for closing an opening 50Y of the shield shell 50, and bolts B2 for fixing the lid member 92 to the shield shell 50. The connector 30 includes a sealing member 100 mounted on the outer peripheries of the shielded cables 20 and a retainer 110 for retaining the sealing member 100.

(Configuration of Shielded Cables 20)

Figure 5:
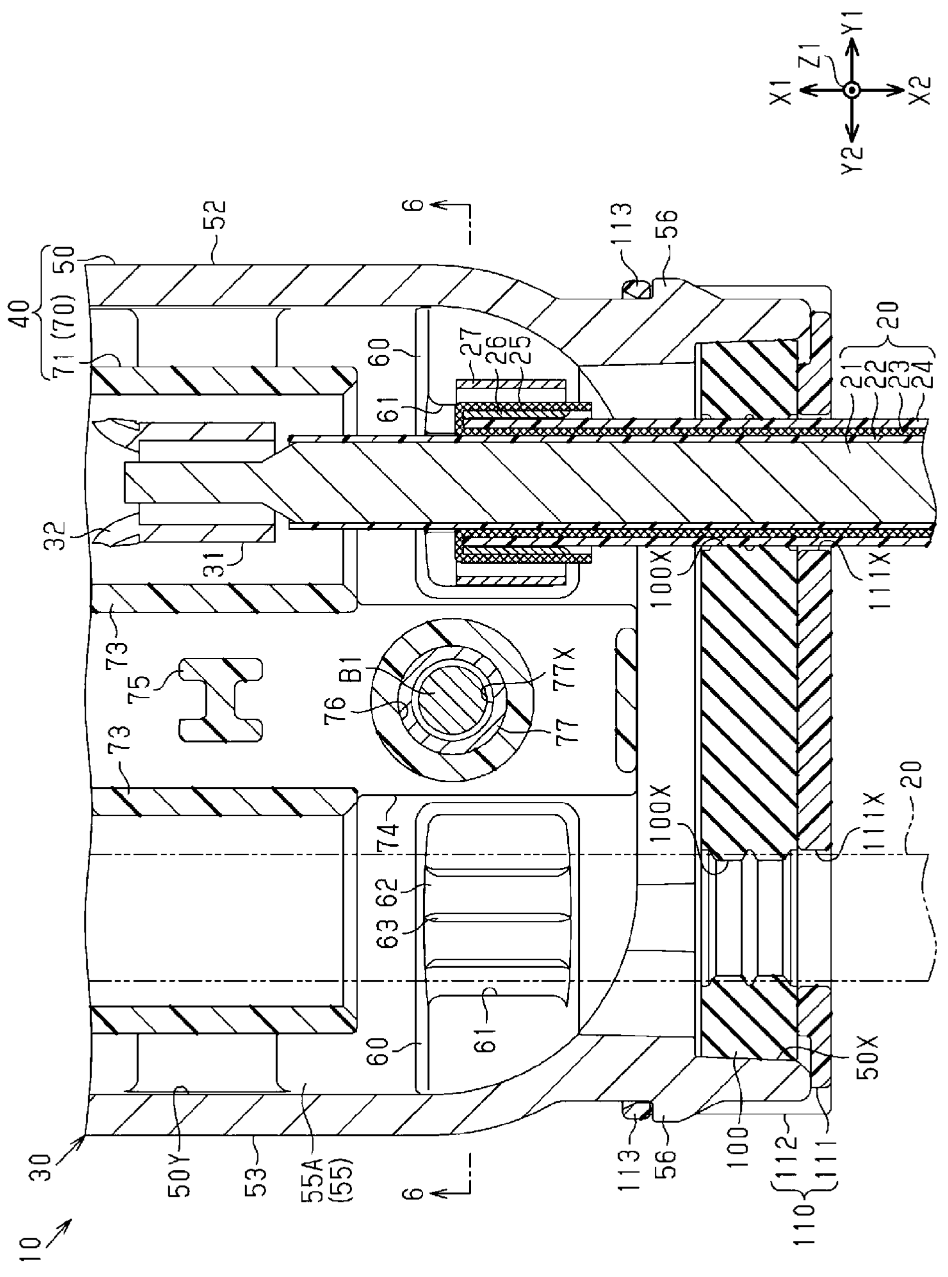
FIG. 5 is a schematic section showing a part of the wiring harness of the embodiment.
Figure 6:
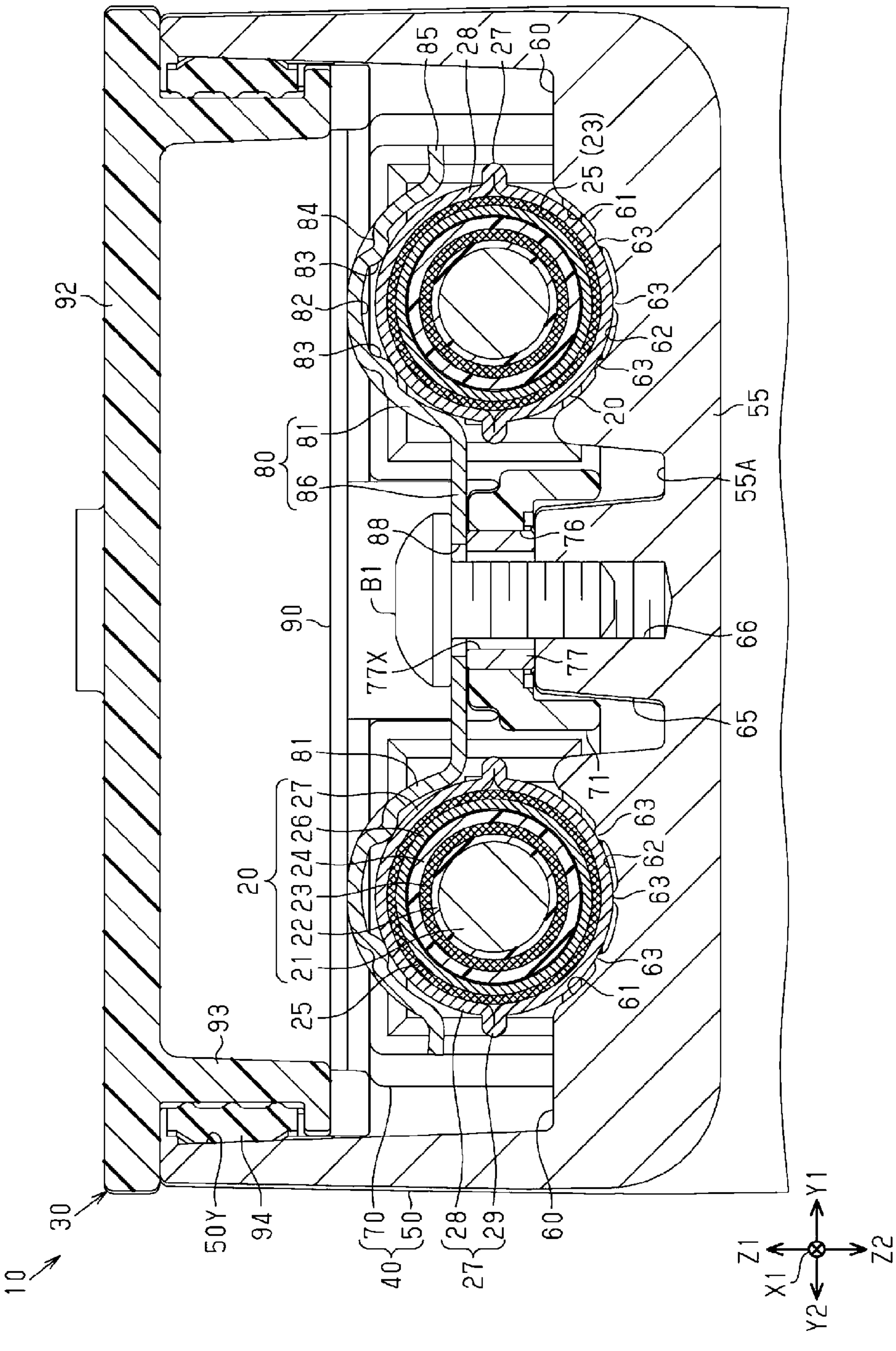
FIG. 6 is a schematic section (section along 6-6 in FIG. 5) showing a part of the wiring harness of the embodiment.
Figure 7:
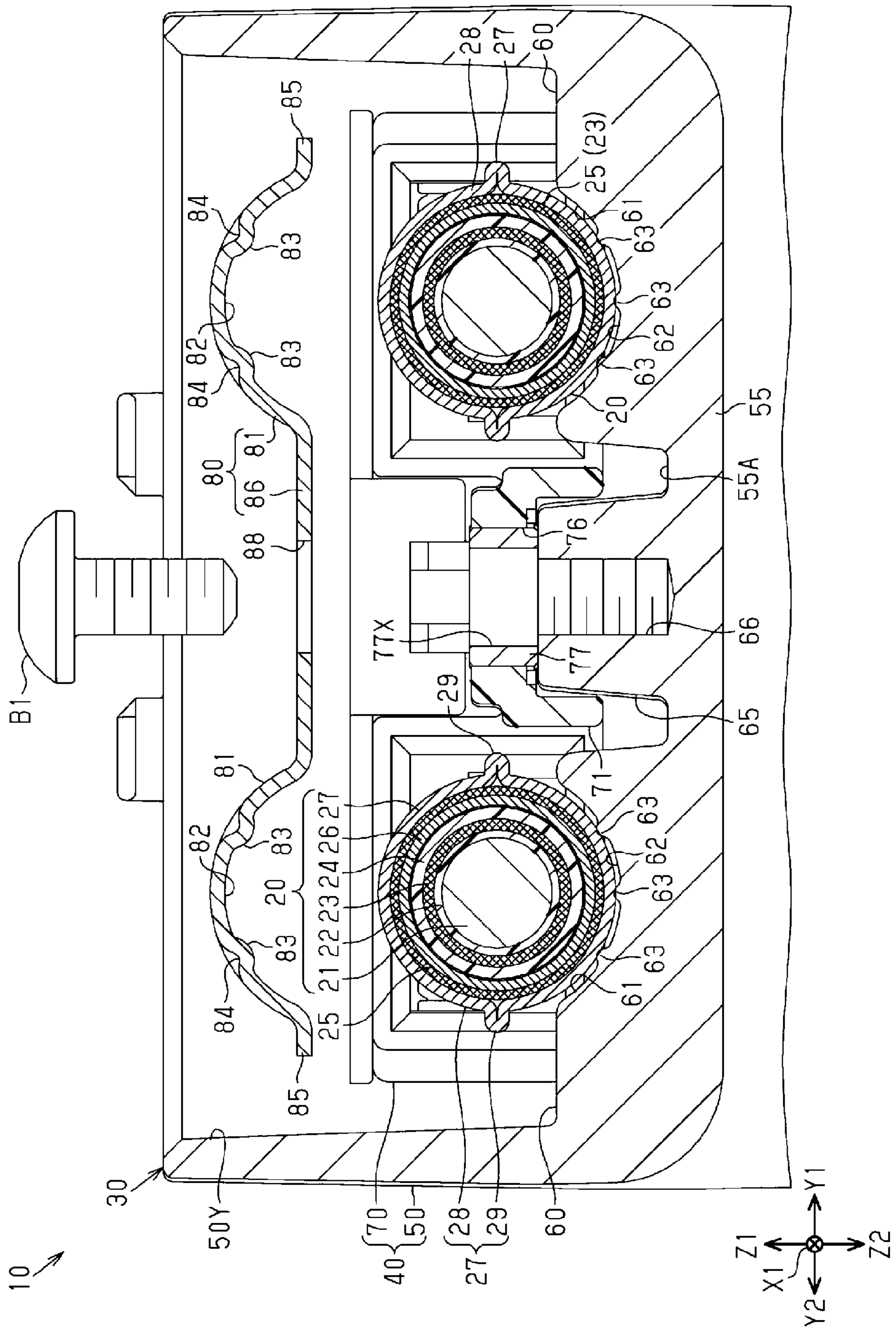
FIG. 7 is a schematic exploded section showing a part of the wiring harness of the embodiment.

As shown in FIGS. 5 to 7, each shielded cable 20 includes an electrically conductive core wire 21 and an insulating insulation coating 22 surrounding the outer periphery of the core wire 21. Each shielded cable 20 includes an electrically conductive electromagnetic shield member 23 surrounding the outer periphery of the insulation coating 22 and an insulating sheath 24 surrounding the outer periphery of the electromagnetic shield member 23. As just described, each shielded cable 20 has an electromagnetic shielding structure itself. Note that, out of the two shielded cables 20, one (left) shielded cable 20 is shown in a simplified manner by a two-dot chain line in FIG. 5. Further, out of the two terminals 31, one (left) terminal 31 is shown in a simplified manner by a two-dot chain line in FIG. 5.

A stranded wire formed by twisting a plurality of metal strands together or a single core wire constituted by a single conductor can be, for example, used as the core wire 21. A columnar conductor constituted by one columnar metal rod having a solid inner structure or a tubular conductor having a hollow inner structure can be, for example, used as the single core wire. Further, a stranded wire, a columnar conductor and a tubular conductor may be used in combination as the core wire 21. A copper-based or aluminum-based metal material can be, for example, used as a material of the core wire 21.

A cross-sectional shape of the core wire 21 cut along a plane orthogonal to a length direction of the core wire 21, i.e. a transverse cross-sectional shape of the core wire 21, can be formed into an arbitrary shape. The transverse cross-sectional shape of the core wire 21 can be, for example, formed into a circular shape, a semicircular shape, a polygonal shape or a flat shape. As shown in FIGS. 6 and 7, the transverse cross-sectional shape of the core wire 21 of this embodiment is formed into a circular shape.

The insulation coating 22 covers, for example, the outer peripheral surface of the core wire 21 over an entire circumference in a circumferential direction. The insulation coating 22 is, for example, made of an insulating resin material.

The electromagnetic shield member 23 surrounds, for example, the outer peripheral surface of the insulation coating 22 over an entire circumference in the circumferential direction. The electromagnetic shield member 23 is, for example, flexible. A braided wire formed by braiding a plurality of metal strands into a tubular shape or a metal foil can be, for example, used as the electromagnetic shield member 23. The electromagnetic shield member 23 of this embodiment is a braided wire. A copper-based or aluminum-based metal material can be, for example, used as a material of the electromagnetic shield member 23.

The sheath 24 surrounds, for example, the outer peripheral surface of the electromagnetic shield member 23 over an entire circumference in the circumferential direction. The sheath 24 is, for example, made of an insulating resin material.

As shown in FIG. 1, each shielded cable 20 extends along a first direction X toward the connector 30. The first direction X1 is an arbitrarily set direction. An axial direction of each shielded cable 20 of this embodiment extends in parallel to the first direction X1. The plurality of shielded cables 20 are, for example, arranged side by side in a second direction Y1.

A direction opposite to the first direction X1 is referred to as a first opposite direction X2 below in describing a relationship of the respective constituent elements of the wiring harness 10. Further, out of directions orthogonal to the first direction X1, a direction toward a right side in FIG. 1 is referred to as the second direction Y1 and a direction opposite to the second direction Y1 is referred to as a second opposite direction Y2. Out of directions orthogonal to both the first and second directions X1, Y1, a direction toward the right side in FIG. 1 is referred to as a third direction Z1 and a direction opposite to the third direction Z1 is referred to as a third opposite direction Z2. Each direction described above is a direction in a state where the connector 30 is mounted on the end parts of the shielded cables 20 unless otherwise particularly specified.

As shown in FIG. 5, an end part in the axial direction of the core wire 21 (here, the first direction X1) is exposed from the insulation coating 22. The terminal 31 is connected to the end part of the core wire 21 exposed from the insulation coating 22. The terminal 31 is, for example, accommodated inside the inner housing 70.

An end part in the axial direction (here, the first direction X1) of the electromagnetic shield member 23 includes an exposed portion 25 exposed from the sheath 24. The exposed portion 25 is, for example, folded in the first opposite direction X2. The exposed portion 25 is folded to cover the outer periphery of an end part in the axial direction (here, the first direction X1) of the sheath 24. Here, an underlay member 26 is mounted on the end part in the first direction X1 of the sheath 24. The underlayer member 26 is, for example, formed into an annular shape to surround the outer peripheral surface of the sheath 24 over an entire circumference in the circumferential direction. The exposed portion 25 is folded to cover the outer periphery of the underlayer member 26. A folded part of the exposed portion 25 surrounds, for example, the outer peripheral surface of the underlayer member 26 over an entire circumference in the circumferential direction. A copper-based or aluminum-based metal material can be, for example, used as a material of the underlayer member 26.

Each shielded cable 20 includes, for example, a shell ring 27 mounted on the outer periphery of the electromagnetic shield member 23 while being held in contact with the outer peripheral surface of the electromagnetic shield member 23. The shell ring 27 is, for example, mounted on the outer periphery of the folded part of the exposed portion 25. The shell ring 27 is, for example, in contact with the outer peripheral surface of the folded part of the exposed portion 25. As shown in FIG. 6, the shell ring 27 is, for example, in contact with the shield shell 50 and the shield bracket 80. For example, the shell ring 27 electrically connects the electromagnetic shield member 23 and the shield shell 50.

As shown in FIG. 7, the shell ring 27 includes, for example, a body portion 28 formed into an annular shape and one or more fastening portions 29 projecting radially outward from the body portion 28. The shell ring 27 of this embodiment includes two fastening portions 29. The body portion 28 of this embodiment is formed into a circular ring shape along the outer peripheral surface of the cylindrical core wire 21. The inner peripheral surface of the body portion 28 is in contact with the outer peripheral surface of the folded part of the exposed portion 25. The inner peripheral surface of the body portion 28 is, for example, in close contact with the outer peripheral surface of the folded part of the exposed portion 25 over the entire circumference of the body portion 28 in the circumferential direction.

The shell ring 27 is, for example, mounted on the folded part of the exposed portion 25 by being crimped to the folded part from the outside of the folded part. The shell ring 27 is, for example, mounted on the outer periphery of the electromagnetic shield member 23 by being crimped to the underlay member 26 while sandwiching the electromagnetic shield member 23 between the outer peripheral surface of the underlay member 26 and the shell ring 27. For example, the shell ring 27 is fixed to the outer periphery of the electromagnetic shield member 23 by drawing and deforming the fastening portions 29 to reduce a diameter of the body portion 28. In this way, the shell ring 27 is in contact with the outer peripheral surface of the exposed portion 25 and electrically connected to the electromagnetic shield member 23. Here, a crimped part of the shell ring 27 is, for example, provided at a position overlapping the underlay member 26 in a radial direction of the shielded cable 20. In this way, when the shell ring 27 is crimped to the folded part of the exposed portion 25, the deformation of the shielded cable 20 itself can be suppressed since the underlay member 26 is interposed between the exposed portion 25 and the sheath 24. As a result, the stability of electrical connection of the electromagnetic shield member 23 and the shell ring 27 can be improved.

(Configuration of Terminals 31)

As shown in FIG. 4, each terminal 31 is accommodated inside the inner housing 70. As shown in FIG. 2, each terminal 31 includes a wire connecting portion 32 to be connected to an end part in the first direction X1 of the shielded cable 20 and a terminal connecting portion 33 to be connected to an unillustrated mating terminal. The wire connecting portion 32 is, for example, bolted to the terminal connecting portion 33. A metal material such as copper, copper alloy, aluminum, aluminum alloy or stainless steel can be, for example, used as a material of each terminal 31. Note that the mating terminal can be, for example, a connection terminal provided in a mating connector to be connected to the connector 30.

The wire connecting portion 32 is connected to the end part in the first direction X1 of the core wire 21 exposed from the insulation coating 22. The wire connecting portion 32 is, for example, connected to the core wire 21 by crimping or ultrasonic welding. In this way, the wire connecting portion 32 and the core wire 21 are electrically and mechanically connected.

The terminal connecting portion 33 projects, for example, in the third opposite direction Z2 from the wire connecting portion 32. A female terminal 34 formed into an annular shape is provided on the tip of the terminal connecting portion 33. The female terminal 34 is, for example, formed to have a rectangular annular outer edge shape.

(Configuration of Inner Housing 70)

The inner housing 70 includes, for example, a base portion 71 and a terminal accommodating portion 72. The inner housing 70 is, for example, made of synthetic resin. The inner housing 70 is a component different from the shield shell 50.

As shown in FIG. 5, the base portion 71 includes, for example, two accommodation tubes 73. A part of the wire connecting portion 32 of the terminal 31 is accommodated in each accommodation tube 73. A connected part of the core wire 21 of the shielded cable 20 and the wire connecting portion 32 is, for example, accommodated in each accommodation tube 73. The base portion 71 includes, for example, a plate-like portion 74 extending along the first direction X1. The plate-like portion 74 is provided between the two accommodation tubes 73. The plate-like portion 74 projects, for example, further in the first opposite direction X2 than end surfaces in the first opposite direction X2 of the accommodation tubes 73. The plate-like portion 74 includes, for example, a positioning projection 75 projecting in the third direction Z1. The positioning projection 75 is, for example, provided between the two accommodation tubes 73. The positioning projection 75 is, for example, formed into an H shape in a plan view from the third direction Z1.

The plate-like portion 74 includes, for example, a fixing hole 76. The fixing hole 76 is, for example, formed to penetrate through the plate-like portion 74 in the third direction Z1. The fixing hole 76 is, for example, provided at a position further than the positioning projection 75 in the first opposite direction X2. The fixing hole 76 is, for example, provided at the position in the first opposite direction X2 further than the end surfaces in the first opposite direction X2 of the accommodation tubes 73. As shown in FIG. 6, a collar 77 made of metal, into which the bolt B1 is insertable, is mounted in the fixing hole 76. A copper-based, aluminum-based or iron-based metal material or the like can be, for example, used as a material of the collar 77. The collar 77 includes a through hole 77X, through which the bolt B1 is passed. The inner housing 70 is, for example, fixed to the shield shell 50 by the bolt B1 inserted into the fixing hole 76 and the through hole 77X of the collar 77.

As shown in FIG. 2, the terminal accommodating portion 72 is, for example, formed to extend in the third opposite direction Z2 from an end part in the first direction X1 of the base portion 71. As shown in FIG. 4, the terminal accommodating portion 72 includes two accommodation tubes 78. The internal spaces of the two accommodation tubes 78 respectively communicate with those of the two accommodation tubes 73. A part of the wire connecting portion 32 of the terminal 31 and the terminal connecting portion 33 of the terminal 31 are accommodated in each accommodation tube 78. The connected part of the wire connecting portion 32 and the terminal connecting portion 33 is accommodated in each accommodation tube 78. The terminal accommodating portion 72 includes, for example, the opening 72X open in the third direction Z1. The opening 72X exposes, for example, the connected part of the wire connecting portion 32 and the terminal connecting portion 33, i.e. a bolted part in this embodiment.

As shown in FIG. 2, a sealing member 79 is, for example, mounted on the outer peripheral surface of the terminal accommodating portion 72. The sealing member 79 is, for example, formed into an annular shape continuous over the entire circumference of the terminal accommodating portion 72 in the circumferential direction. The sealing member 79 seals between the outer peripheral surface of the terminal accommodating portion 72 and the inner peripheral surface of the shield shell 50. The sealing member 79 is, for example, made of rubber.

(Configuration of Shield Shell 50)

As shown in FIG. 4, the shield shell 50 surrounds the outer periphery of the inner housing 70. The shield shell 50 is, for example, formed into a box shape as a whole. The shield shell 50 is, for example, made of metal. A copper-based, aluminum-based or iron-based metal material or the like can be, for example, used as a material of the shield shell 50. The shield shell 50 is, for example, made of aluminum die casting.

As shown in FIG. 5, the shield shell 50 includes, for example, an opening 50X open in the first opposite direction X2. The shielded cables 20 are inserted into the opening 50X of the shield shell 50 along the first direction X1. The shielded cables 20 accommodated into the shield shell 50 are inserted into the inner housing 70.

As shown in FIG. 2, the shield shell 50 includes a peripheral wall 51 provided on a side in the first direction X1, a peripheral wall 53 provided on a side in the second direction Y1 and a peripheral wall 53 provided on a side in the second opposite direction Y2. The shield shell 50 includes a peripheral wall 54 provided on a side in the third direction Z1 and a peripheral wall 55 provided on a side in the third opposite direction Z2.

The shield shell 50 includes the opening 50Y open in the third direction Z1 and an opening 50Z open in the third opposite direction Z2. The opening 50Y is formed in the peripheral wall 54 provided on the side in the third direction Z1 of the shield shell 50. The opening 50Y is formed to penetrate through a part of the peripheral wall 54 in the third direction Z1. The opening 50Y is, for example, provided to penetrate through most of the peripheral wall 54 near the side in the first direction X1. The opening 50Y is formed to have such a size that the inner housing 70 is insertable thereinto. The opening 50Y communicates with the internal space of the shield shell 50.

The opening 50Z is formed in the peripheral wall 55 provided on the side in the third opposite direction Z2 of the shield shell 50. The opening 50Z is formed to penetrate through a part of the peripheral wall 55 in the third direction Z1. The opening 50Z is, for example, provided on an end part in the first direction X1 of the peripheral wall 55. The opening 50Z is formed to have such a size that the terminal accommodating portion 72 of the inner housing 70 is insertable thereinto. The opening 50Z communicates with the internal space of the shield shell 50. The terminal accommodating portion 72 is passed through the opening 50Z. The opening 50Z is, for example, smaller than the opening 50Y. For example, an opening width of the opening 50Z along the first direction X1 is smaller than that of the opening 50Y along the first direction X1. The inner housing 70 is inserted into the shield shell 50 along the third opposite direction Z2 through the opening 50Y.

As shown in FIG. 5, the outer peripheral surface of the shield shell 50 includes one or more (two in this embodiment) engaging portions 56. One engaging portion 56 is provided on the outer surface of an end part in the first opposite direction X2 of the peripheral wall 52 and one engaging portion 56 is provided on the outer surface of an end part in the first opposite direction X2 of the peripheral wall 53. The two engaging portions 56 project, for example, in directions away from each other along the second direction Y1. The respective engaging portions 56 project radially outwardly of the shield shell 50 from the outer surfaces of the peripheral walls 52, 53.

As shown in FIG. 2, an end surface 55A in the third direction Z1 of the peripheral wall 55, i.e. an inner surface 55A of the peripheral wall 55, is provided with a plurality of (two in this embodiment) projecting portions 60 projecting in the third direction Z1 from the inner surface 55A and a fixing portion 65 projecting in the third direction Z1 from the inner surface 55A.

As shown in FIG. 5, the two projecting portions 60 are respectively provided to correspond to the two shielded cables 20. The two projecting portions 60 are, for example, provided side by side along the second direction Y1. The two projecting portions 60 are, for example, provided apart from each other in the second direction Y1. The two projecting portions 60 are, for example, provided at positions further than the accommodation tubes 73 of the inner housing 70 in the first opposite direction X2.

Each projecting portion 60 includes a recess 61 recessed toward the inner surface 55A from the projecting tip surface of the projecting portion 60. The recess 61 extends, for example, along the axial direction of the shielded cable 20 (here, the first direction X1). The recess 61 extends, for example, over the entire length of the projecting portion 60 in the first direction X1.

As shown in FIGS. 6 and 7, the recess 61 has a first facing surface 62 facing the shielded cable 20. The first facing surface 62 is, for example, the inner surface of the recess 61. The first facing surface 62 is, for example, facing the shell ring 27. The first facing surface 62 is formed into a shape corresponding to the outer peripheral surface of the shell ring 27. The first facing surface 62 of this embodiment is formed into a curved surface arcuately curved along the outer peripheral surface of the body portion 28 of the shell ring 27 having a circular ring shape. The recess 61 is formed to have such a size that a part of the shell ring 27 is fittable thereinto.

The recess 61 includes one or more first protrusions 63 projecting from the first facing surface 62 toward the electromagnetic shield member 23 and to be brought into contact with the shielded cable 20. The recess 61 includes three first protrusions 63 provided apart from each other in the circumferential direction of the shielded cable 20. The three first protrusions 63 are, for example, provided at equal intervals in the circumferential direction. Each first protrusion 63 is provided to be able to contact the outer peripheral surface of the shell ring 27. For example, at least two of the three first protrusions 63 are in contact with the outer peripheral surface of the body portion 28 of the shell ring 27. As shown in FIG. 5, each first protrusion 63 extends, for example, along the axial direction of the shielded cable 20 (here, the first direction X1). Each first protrusion 63 extends, for example, over the entire length of the recess 61 in the first direction X1.

As shown in FIG. 7, the fixing portion 65 is formed into a columnar shape projecting in the third direction Z1 from the inner surface 55A of the peripheral wall 55. The fixing portion 65 is, for example, provided between the two projecting portions 60 in the second direction Y1. The fixing portion 65 is, for example, provided apart from the two projecting portions 60 in the second direction Y1. The fixing portion 65 includes a fixing hole 66, into which the bolt B1 is inserted. The fixing hole 66 is formed to be recessed toward the inner surface 55A of the peripheral wall 55 from the projecting tip surface of the fixing portion 65. The fixing hole 66 is provided at a position overlapping the fixing hole 76 of the inner housing 70 and the collar 77 mounted in the fixing portion 76 in a plan view from the third direction Z1. The fixing hole 66 is provided to communicate with the through hole 77X of the collar 77.

(Configuration of Shield Bracket 80)

The shield bracket 80 includes, for example, a plurality of fixing portions 81 and a coupling portion 86 coupling the plurality of fixing portions 81. The shield bracket 80 is, for example, a single component in which the plurality of fixing portions 81 and the coupling portion 86 are continuously and integrally formed. The shield bracket 80 is, for example, made of metal. A copper-based, aluminum-based or iron-based metal material or the like can be, for example, used as a material of the shield bracket 80.

The two fixing portions 81 are respectively provided to correspond to the two shielded cables 20. The two fixing portions 81 are, for example, provided side by side along the second direction Y1. The two fixing portions 81 are, for example, provided apart from each other in the second direction Y1.

Each fixing portion 81 has a second facing surface 82 facing the shielded cable 20. The second facing surface 82 is, for example, facing the shell ring 27. The second facing surface 82 is, for example, facing the first facing surface 62 of the shield shell 50. The second facing surface 82 is, for example, formed into a shape corresponding to the outer peripheral surface of the shell ring 27. The second facing surface 82 of this embodiment is formed into a curved surface arcuately curved along the outer peripheral surface of the body portion 28 of the shell ring 27 having a circular ring shape. A transverse cross-sectional shape along the second facing surface 82 of this embodiment is formed into a semicircular shape as a whole. A transverse cross-sectional shape along the outer surface of the fixing portion 81 is, for example, formed into a semicircular shape as a whole similarly to the second facing surface 82. A first end part in the circumferential direction of the second facing surface 82 is connected to the coupling portion 86.

Each fixing portion 81 includes one or more second protrusions 83 projecting from the second facing surface 82 toward the electromagnetic shield member 23 and to be brought into contact with the shielded cable 20. Each fixing portion 81 includes two second protrusions 83 provided apart from each other in the circumferential direction of the shielded cable 20. Each second protrusion 83 is provided to be able to contact the outer peripheral surface of the shell ring 27. For example, at least one of the two second protrusions 83 is in contact with the outer peripheral surface of the body portion 28 of the shell ring 27.

Each second protrusion 83 can be formed, for example, by embossing. Each second protrusion 83 is, for example, formed into an embossed shape by pressurizing the outer surface of the fixing portion 81 by a die. A transverse cross-sectional shape of each second protrusion 83 is, for example, formed into a semicircular shape projecting toward the shielded cable 20. In each fixing portion 81, recessed portions 84 are provided on the outer surface in parts where the second protrusions 83 are formed. The recessed portions 84 are formed to be recessed toward the second facing surface 82 from the outer surface of the fixing portion 81.

Figure 8:
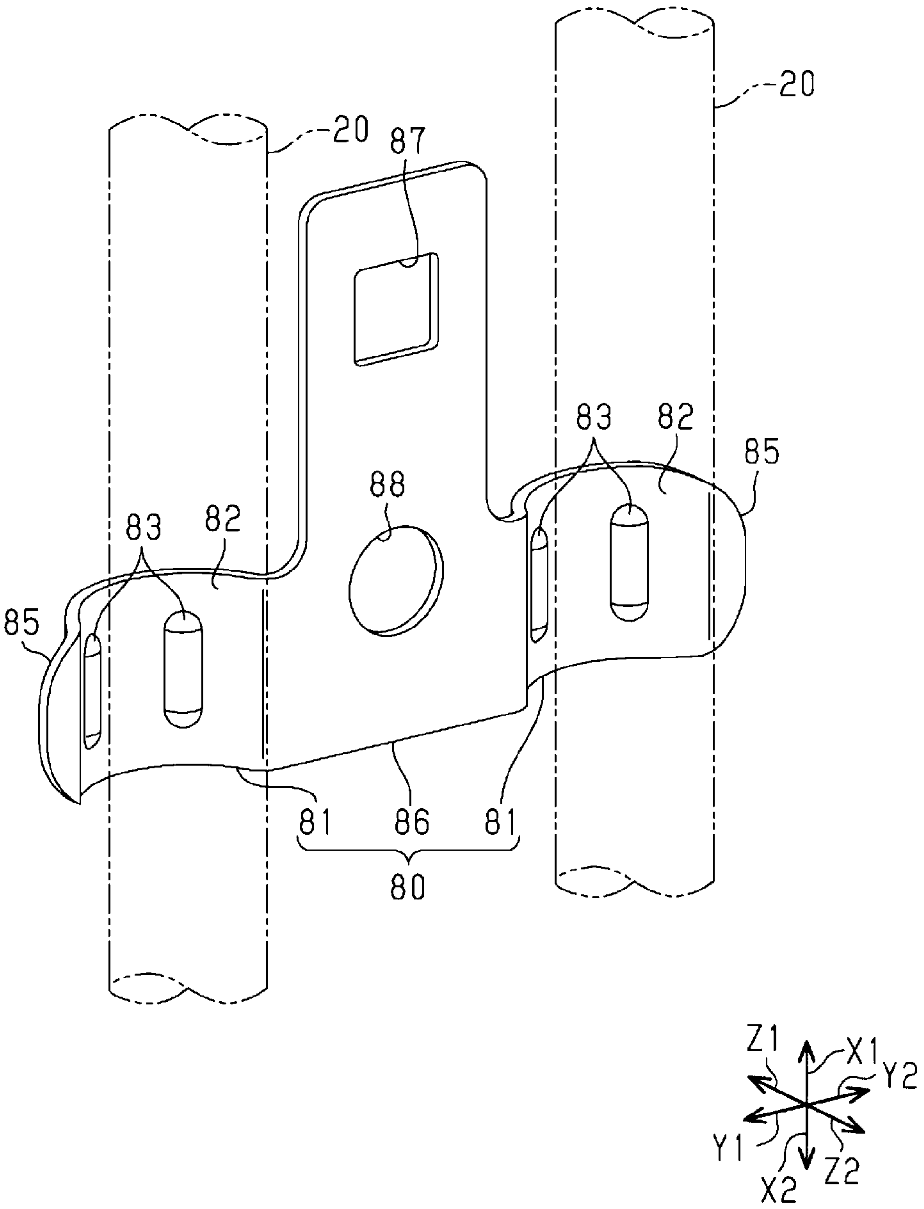
FIG. 8 is a schematic perspective view showing a shield bracket of the embodiment.

As shown in FIG. 8, each second protrusion 83 extends, for example, along the axial direction of the shielded cable 20 (here, the first direction X1). Each second protrusion 83 is, for example, formed only in an intermediate apart of the fixing portion 81 in the first direction X1. In other words, each second protrusion 83 does not extend to an end part in the first direction X1 of the fixing portion 81.

Each fixing portion 81 includes an extending portion 85 extending in the second direction Y1 or second opposite direction Y2. The extending portion 85 extends in a direction away from the coupling portion 86 from a second end part in the circumferential direction of the second facing surface 82. Here, the second end part in the circumferential direction of the second facing surface 82 is an end part provided on a side opposite to the first end part connected to the coupling portion 86, out of the end parts in the circumferential direction of the second facing surface 82. The extending portion 85 extends, for example, horizontally along the second direction Y1.

The coupling portion 86 is provided between the two fixing portions 81 in the second direction Y1. Both end parts in the second direction Y1 of the coupling portion 86 are respectively connected to the two fixing portions 81. The coupling portion 86 is, for example, in the form of a flat plate. The coupling portion 86 is, for example, formed to extend in the first direction X1. The coupling portion 86 is, for example, formed to project further in the first direction X1 than the end parts in the first direction X1 of the fixing portions 81. An end part in the first opposite direction X2 of the coupling portion 86 is provided at the same position as the end parts in the first opposite direction X2 of the fixing portions 81 in the first opposite direction X2. A length of the coupling portion 86 along the first direction X1 is larger than those of the fixing portions 81 along the first direction X1.

The coupling portion 86 includes, for example, a positioning hole 87. The positioning hole 87 is, for example, provided at a position further than the fixing portions 81 in the first direction X1. The positioning hole 87 is formed to penetrate through the coupling portion 86 in a plate thickness direction of the coupling portion 86 (here, the third direction Z1). The positioning hole 87 is, for example, formed into a rectangular shape in a plan view from a penetration direction of the positioning hole 87 (here, the third direction Z1). As shown in FIG. 3, the positioning hole 87 is formed in such a size as to be fittable outside the positioning projection 75 of the inner housing 70. If being fit outside the positioning projection 75, the positioning hole 87 is engaged with the positioning projection 75 in the axial direction of the shielded cables 20 (here, the first direction X1). If being fit outside the positioning projection 75, the positioning hole 87 is engaged with the positioning projection 75 in the second direction Y1. By fitting the positioning hole 87 to the positioning projection 75 in this way, the shield bracket 80 can be easily positioned with respect to the connector housing 40 in the first direction X1 and second direction Y1. If the shield bracket 80 is positioned with respect to the connector housing 40, each fixing portion 81 faces the recess 61 of the projecting portion 60 of the shield shell 50 in the third opposite direction Z2.

As shown in FIG. 4, the coupling portion 86 includes a fixing hole 88, into which the bolt B1 is inserted. The fixing hole 88 is, for example, provided at a position partially overlapping the fixing portions 81 in the second direction Y1. The fixing hole 88 is formed to penetrate through the coupling portion 86 in the third direction Z1. The fixing hole 88 is, for example, formed into a circular shape in a plan view from a penetration direction of the fixing hole 88 (here, the third direction Z1). As shown in FIG. 6, the fixing hole 88 is provided at a position overlapping the fixing hole 76 of the inner housing 70 and the fixing hole 66 of the shield shell 50 in the plan view from the third direction Z1. The fixing hole 88 is provided to communicate with the through hole 77X of the collar 77 mounted in the fixing hole 76 and the fixing hole 66. As shown in FIG. 4, in the shield bracket 80 of this embodiment, if the positioning hole 87 is fit and positioned to the positioning projection 75, the fixing hole 88 is aligned to communicate with the through hole 77X of the collar 77.

As shown in FIG. 6, the shield bracket 80 is fixed to the shield shell 50 by the bolt B1 inserted into the fixing hole 88. That is, the shield bracket 80 is bolted to the shield shell 50. In particular, the fixing hole 88 is overlapped with the through hole 77X of the collar 77 mounted in the fixing hole 76 of the inner housing 70 and the fixing hole 66 of the shield shell 50 in the third direction Z1, which is a direction intersecting the axial direction of the shielded cables 20. By screwing the bolt B1 into the fixing hole 88, the through hole 77X and the fixing hole 66 overlapped with each other, the shield bracket 80 is bolted to the shield shell 50 and the inner housing 70. At this time, the inner housing 70 is also bolted to the shield shell 50 by the bolt B1.

The shield bracket 80 presses and fixes the shielded cables 20 to the shield shell 50. The shield bracket 80 presses and fixes the shielded cables 20 to the shield shell 50 with the electromagnetic shield members 23 electrically connected to the shield shell 50. For example, the shield bracket 80 presses and fixes the shell rings 27 to the shield shell 50 while being held in contact with the shell rings 27 of the shielded cables 20. The shield bracket 80 presses the shell rings 27 toward the shield shell 50 while sandwiching the shell rings 27 between the shield shell 50 and the shield bracket 80 in the third direction Z1 intersecting the axial direction of the shielded cables 20. For example, each fixing portion 81 of the shield bracket 80 presses the shell ring 27 of each shielded cable 20 toward the first facing surface 62 of each recess 61 by an axial force generated by tightening the bolt B1. At this time, the second protrusions 83 of each fixing portion 81 are in contact with the outer peripheral surface of the shielded cable 20, and the first protrusions 63 of each recess 61 are in contact with the outer peripheral surface of the shielded cable 20. In this embodiment, the second protrusions 83 of each fixing portion 81 are in contact with the outer peripheral surface of the shell ring 27 and the first protrusions 63 of each recess 61 are in contact with the outer peripheral surface of the shell ring 27. For example, at least two of the three first protrusions 63 are in contact with the outer peripheral surface of the shell ring 27 and at least one of the two second protrusions 83 is in contact with the outer peripheral surface of the shell ring 27. In this way, the shield shell 50 and the electromagnetic shield member 23 are electrically connected through the shell ring 27. The electromagnetic shield member 23 is grounded to an unillustrated ground part through the shell ring 27 and the shield shell 50.

(Configuration of Cover 90)

As shown in FIG. 3, the cover 90 is mounted on the inner housing 70 to close the opening 72X of the terminal accommodating portion 72 of the inner housing 70. The cover 90 is provided to close the entire opening 72X.

(Configuration of Lid Member 92)

As shown in FIG. 2, the lid member 92 is mounted on the shield shell 50 to close the opening 50Y of the shield shell 50. The lid member 92 is provided to close the entire opening 50Y. The lid member 92 is fixed to the shield shell 50 by one or more (two in this embodiment) bolts B2.

As shown in FIG. 6, the lid member 92 includes a fitting portion 93 to be fit inside the shield shell 50. The fitting portion 93 is, for example, formed into a frame shape as a whole. The outer peripheral surface of the fitting portion 93 is formed into a shape along the inner peripheral surface of the opening 50Y. The outer peripheral surface of the fitting portion 93 is, for example, formed into a rectangular shape in a plan view from the third direction Z1. A sealing member 94 is mounted on the outer peripheral surface of the fitting portion 93. The sealing member 94 is formed into an annular shape continuous over the entire circumference of the frame-like fitting portion 93 in the circumferential direction. The sealing member 94 seals between the outer peripheral surface of the fitting portion 93 and the inner peripheral surface of the shield shell 50. The sealing member 94 is, for example, made of rubber.

(Configuration of Sealing Member 100)

As shown in FIG. 2, the sealing member 100 is, for example, collectively mounted on the two shielded cables 20. The sealing member 100 is provided at a position further than the shell rings 27 in the first opposite direction X2. As shown in FIG. 5, the sealing member 100 includes, for example, two through holes 100X, through which the two shielded cables 20 are individually passed. The two through holes 100X are provided apart from each other in the second direction Y1. Each through hole 100X is, for example, formed to penetrate through the sealing member 100 in the first direction X1. The inner peripheral surface of each through hole 100X is formed into a shape along the outer peripheral surface of the shielded cable 20. The outer peripheral surface of the sealing member 100 is, for example, formed into a shape along the inner peripheral surface of the end part in the first opposite direction X2 of the shield shell 50, specifically the inner peripheral surface of the opening 50X. The sealing member 100 seals between the outer peripheral surfaces of the shielded cables 20 and the inner peripheral surface of the shield shell 50. The sealing member 100 is, for example, made of rubber.

(Configuration of Retainer 110)

The retainer 110 is, for example, mounted on the end part in the first opposite direction X2 of the shield shell 50. The retainer 110 prevents the sealing member 100 from coming out from the shield shell 50. The retainer 110 includes a body portion 111 and a coupling portion 112 projecting in the first direction X1 from the body portion 111. The body portion 111 is provided to close the opening 50X of the shield shell 50. The body portion 111 includes two wire through holes 111X, through which the two shielded cables 20 are individually passed. Each wire through hole 111X penetrates through the body portion 111 in the first direction X1. The coupling portion 112 is provided to cover a part of the outer peripheral surface of the shield shell 50. The coupling portion 112 includes engaging portions 113 to be engaged with the engaging portions 56 of the shield shell 50. By engaging the engaging portions 56 of the retainer 110 and the engaging portions 56 of the shield shell 50 with each other, the retainer 110 is mounted on the shield shell 50.

Note that each shielded cable 20 is passed through the sealing member 100 and the retainer 110 and pulled out to the outside of the shield shell 50 in the first opposite direction X2.

Next, functions and effects of this embodiment are described.

(1) The connector 30 is connected to the end parts of the shielded cables 20 each including the electrically conductive core wire 21, the insulation coating 22 surrounding the outer periphery of the core wire 21 and the electrically conductive electromagnetic shield member 23 surrounding the outer periphery of the insulation coating 22. The connector 30 is provided with the electrically conductive terminals 31 to be connected to the end parts of the core wires 21 and the electrically conductive shield shell 50 for covering the terminals 31. The connector 30 is provided with the shield bracket 80 for pressing and fixing the shielded cables 20 to the shield shell 50 with the electromagnetic shield members 23 electrically connected to the shield shell 50. The shield shell 50 has the first facing surfaces 62 facing the electromagnetic shield members 23. The shield bracket 80 has the second facing surfaces 82 facing the electromagnetic shield members 23. The first facing surface 62 is provided with the first protrusions 63 projecting toward the electromagnetic shield member 23 and to be brought into contact with the shielded cable 20. The second facing surface 82 is provided with the second protrusions 83 projecting toward the electromagnetic shield member 23 and to be brought into contact with the shielded cable 20.

According to this configuration, the first and second protrusions 63, 83 projecting toward the electromagnetic shield members 23 and to be brought into contact with the shielded cables 20 are respectively provided on the first facing surfaces 62 of the shield shell 50 and the second facing surfaces 82 of the shield bracket 80. Thus, if the shielded cables 20 are pressed against the shield shell 50 by the shield bracket 80, the first and second protrusions 63, 83 can be suitably brought into contact with the shielded cables 20.

If the first and second facing surfaces 62, 82 are smooth curved surfaces or flat surfaces having no protrusions, it is difficult to set contact positions of the first and second facing surfaces 62, 82 with the shielded cables 20. Thus, it is difficult to set shield connection positions of the shield shell 50 and the electromagnetic shield members 23 of the shielded cables 20 and a shield connection state of the shield shell 50 and the electromagnetic shield members 23 tends to be unstable. For example, if the first and second facing surfaces 62, 82 are smooth surfaces having no protrusions, contact areas of the first and second facing surfaces 62, 82 with the shielded cables 20 easily vary. Thus, the shield connection state of the shield shell 50 and the electromagnetic shield members 23 is not stabilized and electromagnetic shielding performance by the shield shell 50 and the electromagnetic shield members 23 varies.

In contrast, in the above configuration, the contact positions of the shield shell 50 and the shielded cables 20 can be forcibly set at the positions of the first protrusions 63 by providing the first protrusions 63 on the first facing surfaces 62. Further, by providing the second protrusions 82 on the second facing surfaces 82, the contact positions of the shield bracket 80 and the shielded cables 20 can be forcibly set at the positions of the second protrusions 83. Thus, the shield connection positions of the shield shell 50 and the shield bracket 80 with the electromagnetic shield members 23 of the shielded cables 20 are easily set, and the shield connection state of the shield shell 50 and the electromagnetic shield members 23 can be stabilized. For example, by providing the first and second protrusions 63, 83 respectively on the first and second facing surfaces 62, 82, it is possible to suppress a variation in the contact areas of the shield shell 50 and the shield bracket 80 with the shielded cables 20. In this way, stable electromagnetic shielding performance can be ensured.

(2) The second protrusions 83 have an embossed shape. According to this configuration, the second protrusions 83 can be easily formed on the second facing surfaces 82 of the shield bracket 80.

(3) Each of the first and second protrusions 63, 83 extends along the axial direction of the shielded cables 20. According to this configuration, since the first and second protrusions 63, 83 extending along the axial direction of the shielded cables 20 can be brought into contact with the shielded cables 20, wide contact areas of the first and second protrusions 63, 83 with the shielded cables 20 can be ensured.

(4) The shield bracket 80 is bolted to the shield shell 50. The shield bracket 80 can press the shielded cables 20 toward the first facing surfaces 62 of the shield shell 50 by an axial force of the bolt B1 generated at the time of bolting. In this way, the first and second protrusions 63, 83 can be suitably brought into contact with the shielded cables 20.

(5) The coupling portion 86 of the shield bracket 80 is bolted to the shield shell 50 with the plurality of shielded cables 20 pressed against the shield shell 50 by the plurality of fixing portions 81. According to this configuration, the plurality of shielded cables 20 can be pressed and fixed to the shield shell 50 by the single shield bracket 80. In this way, the number of components of the connector 30 can be reduced as compared to the case where the shield bracket 80 is provided individually for each of the plurality of shielded cables 20.

(6) The inner housing 70 of the connector housing 40 includes the positioning projection 75 projecting toward the shield bracket 80. The shield bracket 80 includes the positioning hole 87 to be fit to the positioning projection 75 and engaged with the positioning hole 75 in the axial direction of the shielded cables 20. According to this configuration, the shield bracket 80 can be easily positioned with respect to the connector housing 40 in the axial direction of the shielded cables 20 by fitting the positioning hole 87 to the positioning projection 75. In this way, workability in fixing the shield bracket 80 to the connector housing 40 can be improved.

(7) The shield shell 50 is made of aluminum die casting. According to this configuration, the electrically conductive shield shell 50 can be easily manufactured.

(8) The shielded cable 20 includes the electrically conductive shell ring 27 to be mounted on the outer periphery of the electromagnetic shield member 23 while being held in contact with the outer peripheral surface of the electromagnetic shield member 23. Each of the first and second protrusions 63, 83 is in contact with the outer peripheral surface of the shell ring 27. According to this configuration, the contact positions of the shield shell 50 and the shell ring 27 can be forcibly set at the positions of the first protrusions 63, and the contact positions of the shield bracket 80 and the shell ring 27 can be forcibly set at the positions of the second protrusions 83. Thus, the shield connection positions of the shield shell 50 and the shell ring 27 are easily set, and the shield connection state of the shield shell 50 and the shell ring 27 can be stabilized. Consequently, the shield connection state of the electromagnetic shield member 23 electrically connected to the shell ring 27 and the shield shell 50 can be stabilized. In this way, stably electromagnetic shielding performance can be ensured.

OTHER EMBODIMENTS

The above embodiment can be modified and carried out as follows. The above embodiment and the following modifications can be carried out in combination without technically contradicting each other.

The structure of the shield bracket 80 in the above embodiment can be changed as appropriate.

Figure 9:
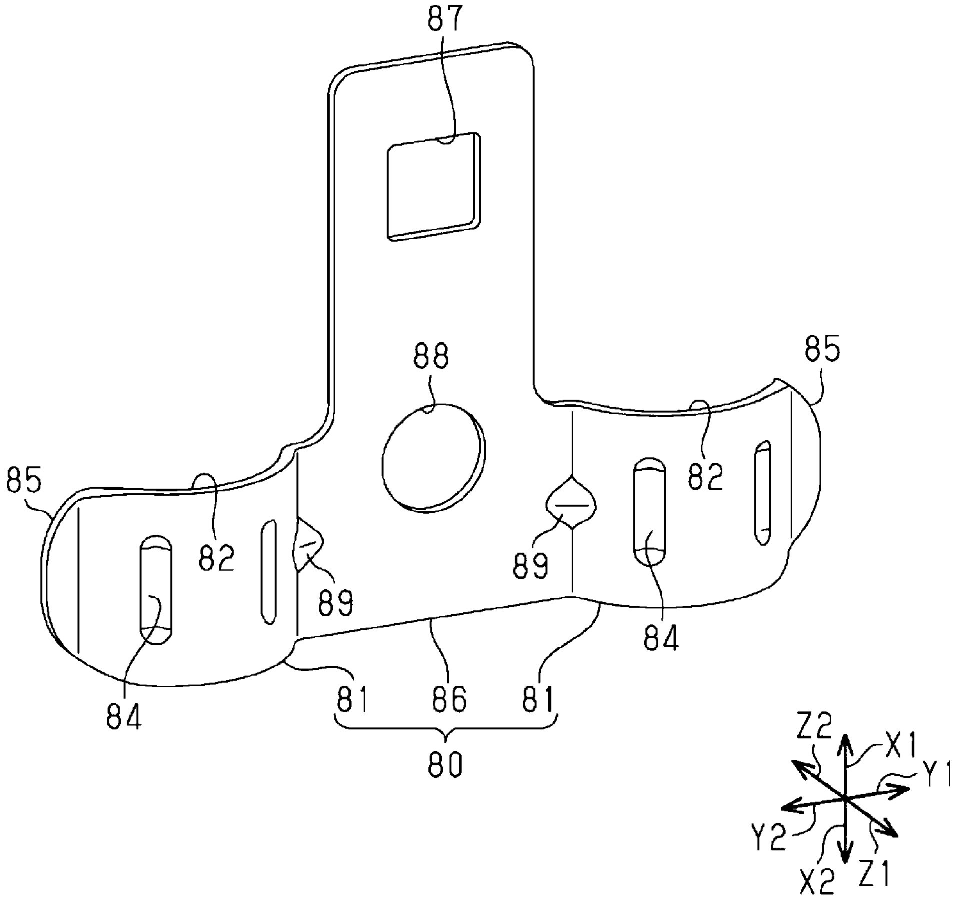
FIG. 9 is a schematic perspective view showing a shield bracket of a modification.

For example, as shown in FIG. 9, ribs 89 may be provided on connected parts of the respective fixing portions 81 and the coupling portion 86. The rib 89 projects, for example, in the third direction Z1 from the outer surface of the coupling portion 86, i.e. an end surface in the third direction Z1 of the coupling portion 86. For example, the rib 89 projects in the third direction Z1 from the outer surface of each fixing portion 81 and projects toward the coupling portion 86 from the outer surface of each fixing portion 81. The rib 89 is, for example, formed into a point shape. The rib 89 can be, for example, formed by embossing. The rib 89 is, for example, formed into an embossed shape by pressurizing the end surface in the third opposite direction Z2 of the coupling portion 86 and the second facing surface 82 of each fixing portion 81 by a die. The rib 89 is, for example, provided only in an intermediate part of the fixing portion 81 in the first direction X1. The rib 89 is, for example, provided only in a central part in the first direction X1 of the fixing portion 81. A length of the rib 89 along the first direction X1 is smaller than those of the second protrusions 83 (see FIG. 8) along the first direction X1.

According to this configuration, the deformation of the connected part of each fixing portion 81 and the coupling portion 86 can be suppressed by providing the rib 89 on the connected part of each fixing portion 81 and the coupling portion 86. For example, since the deformation of the connected part of each fixing portion 81 and the coupling portion 86 can be suppressed in tightening the bolt B1 (see FIG. 7), each fixing portion 81 of the shield bracket 80 can suitably transfer an axial force of the bolt B1 to the shielded cable 20. Therefore, the second protrusions 83 of each fixing portion 81 can suitably press the shielded cable 20 against the first protrusions 63 of the shield shell 50.

Although the shield bracket 80 is bolted to the shield shell 50 by one bolt B1 in the above embodiment, there is no limitation to this. For example, the shield bracket 80 may be bolted to the shield shell 50 by a plurality of bolts B1. Further, the shield bracket 80 may be fixed to the shield shell 50 by a method other than bolting.

Although the second protrusions 83 are formed to extend along the axial direction of the shielded cables 20 in the above embodiment, there is no limitation to this. For example, the second protrusions 83 may be formed to extend along a direction intersecting the axial direction of the shielded cables 20. For example, the second protrusions 83 may be formed into a point shape.

The number of the second protrusions 83 of each fixing portion 81 of the shield bracket 80 of the above embodiment is not particularly limited. For example, the number of the second protrusions 83 of each fixing portion 81 may be one, three or more.

The positioning hole 87 in the shield bracket 80 of the above embodiment may be omitted. In this case, the positioning projection 75 of the inner housing 70 can also be omitted.

The structure of the connector housing 40 in the above embodiment can be changed as appropriate.

Although the positioning projection 75 is provided in the inner housing 70, out of the connector housing 40, in the above embodiment, there is no limitation to this. For example, the positioning projection 75 may be provided in the shield shell 50, out of the connector housing 40.

Although the positioning projection 75 is provided in the connector housing 40 and the positioning hole 87 is provided in the shield bracket 80 in the above embodiment, there is no limitation to this. For example, the positioning hole 87 may be provided in the connector housing 40 and the positioning projection 75 may be provided in the shield bracket 80.

If the inner housing 70 of the above embodiment has a structure capable of holding the terminals 31, the other structures are not particularly limited. For example, the inner housing 70 may be made of a copper-based, aluminum-based or iron-based metal material or the like.

Although the shield bracket 80 is fixed to the connector housing 40 and the inner housing 70 is fixed to the shield shell 50 by the bolt B1 at one position in the above embodiment, there is no limitation to this. For example, the shield bracket 80 may be fixed to the connector housing 40 and the inner housing 70 may be fixed to the shield shell 50 at different positions.

If the shield shell 50 of the above embodiment has a structure for covering the terminals 31 and a structure having the first facing surfaces 62, the other structures are not particularly limited. For example, the shield shell 50 is not necessarily made of aluminum die casting. For example, the shield shell 50 may be formed by a working method such as cutting.

The number of the first protrusions 63 of each recess 61 of the shield shell 50 of the above embodiment is not particularly limited. For example, the number of the first protrusions 63 of each recess 61 may be one, two, four or more.

Although the first protrusions 63 of the shield shell 50 and the second protrusions 83 of the shield bracket 80 are provided as protrusions in the above embodiment, there is no limitation to this. For example, either the first protrusions 63 or the second protrusions 83 may be omitted.

The structure of the shielded cable 20 of the above embodiment can be changed as appropriate.

The shape of the shell ring 27 of the above embodiment is not limited to that of the above embodiment. For example, the outer shape of the shell ring 27 may be any other arbitrary shape such as a polygonal shape or a rectangular shape with rounded corners when viewed from the first direction X1. Note that in the case of changing the shape of the shell ring 27, the shape of the fixing portion 81 of the shield bracket 80 is changed in conformity with the outer shape of the shell ring 27.

The shell ring 27 on the shielded cable 20 of the above embodiment may be omitted. In this case, the first and second protrusions 63, 83 are directly brought into contact with the outer peripheral surface of the electromagnetic shield member 23.

The underlay member 26 in the shielded cable 20 of the above embodiment may be omitted.

The sheath 24 in the shielded cable 20 of the above embodiment may be omitted.

The number of the terminals 31 provided in the connector 30 of the above embodiment is not limited to two. For example, the number of the terminals 31 of the connector 30 may be one, three or more. Note that the number of the shielded cables can be changed as appropriate according to the number of the terminals 31.

The embodiment disclosed this time should be considered illustrative in all aspects, rather than restrictive. The scope of the present invention is represented not by the above meaning, but by claims and intended to include all changes in the scope of claims and in the meaning and scope of equivalents.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector to be connected to an end part of a shielded cable including an electrically conductive core wire, an insulation coating surrounding an outer periphery of the core wire and an electrically conductive electromagnetic shield member surrounding an outer periphery of the insulation coating, comprising:
- an electrically conductive terminal to be connected to an end part of the core wire;
- an electrically conductive shield shell for covering the terminal; and
- a shield bracket for pressing and fixing the shielded cable to the shield shell with the electromagnetic shield member electrically connected to the shield shell,
- the shield shell having a first facing surface facing the electromagnetic shield member,
- the shield bracket having a second facing surface facing the electromagnetic shield member, and
- at least one of the first and second facing surfaces being provided with a protrusion projecting toward the electromagnetic shield member and to be brought into contact with the shielded cable,
- wherein the shielded cable includes an electrically conductive shell ring mounted on an outer periphery of the electromagnetic shield member while being held in contact with an outer peripheral surface of the electromagnetic shield member, and the protrusion is in contact with an outer peripheral surface of the shell ring.

2. The connector of claim 1, wherein the protrusions include:
- one or more first protrusions projecting from the first facing surface toward the electromagnetic shield member and to be brought into contact with the shielded cable; and
- one or more second protrusions projecting from the second facing surface toward the electromagnetic shield member and to be brought into contact with the shielded cable.

3. The connector of claim 2, wherein the second protrusion has an embossed shape.

4. The connector of claim 1, wherein:
- the shield bracket presses and fixes the shielded cable to the shield shell in a direction intersecting an axial direction of the shielded cable, and
- the protrusion extends along the axial direction of the shielded cable.

5. The connector of claim 1, wherein the shield bracket is bolted to the shield shell with the shielded cable pressed against the shield shell.

6. The connector of claim 1, wherein:
- the shield bracket includes a plurality of fixing portions having the second facing surfaces and a coupling portion coupling the plurality of fixing portions, and the coupling portion of the shield bracket is bolted to the shield shell with a plurality of the shielded cables pressed against the shield shell by the plurality of fixing portions.

7. The connector of claim 1, comprising a connector housing including the shield shell, wherein:

the connector housing includes a positioning projection projecting toward the shield bracket, and the shield bracket includes a positioning hole to be fit to the positioning projection and engaged with the positioning projection in an axial direction of the shielded cable.

8. The connector of claim 1, wherein the shield shell is made of aluminum die casting.

9. A wiring harness, comprising:

the connector of claim 1; and the shielded cable to be connected to the terminal.

* * * * *